(12) United States Patent
Wu et al.

(10) Patent No.: US 8,697,260 B2
(45) Date of Patent: Apr. 15, 2014

(54) METHOD AND MANUFACTURE PROCESS FOR EXCHANGE DECOUPLED FIRST MAGNETIC LAYER

(75) Inventors: Zhong Stella Wu, Fremont, CA (US); Samuel Dacke Harkness, IV, Berkeley, CA (US); Mariana R. Munteanu, Santa Clara, CA (US); Qixu Chen, Milpitas, CA (US); Connie Chunling Liu, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 1165 days.

(21) Appl. No.: 12/180,093

(22) Filed: Jul. 25, 2008

(65) Prior Publication Data

US 2010/0020441 A1 Jan. 28, 2010

(51) Int. Cl.
*G11B 5/66* (2006.01)

(52) U.S. Cl.
USPC ............................ 428/827; 428/829; 427/128

(58) Field of Classification Search
None
See application file for complete search history.

(56) References Cited

U.S. PATENT DOCUMENTS

| | | | |
|---|---|---|---|
| 4,251,842 A | 2/1981 | Iwasaki et al. | |
| 4,404,609 A | 9/1983 | Jones, Jr. | |
| 4,442,159 A | 4/1984 | Dezawa et al. | |
| 4,567,083 A | 1/1986 | Arioka et al. | |
| 4,636,448 A | 1/1987 | Morita et al. | |
| 4,642,270 A | 2/1987 | Morita et al. | |
| 4,643,942 A | 2/1987 | Ohtsubo et al. | |
| 4,649,073 A | 3/1987 | Suzuki et al. | |
| 4,652,479 A | 3/1987 | Suzuki et al. | |
| 4,656,546 A | 4/1987 | Mallory | |
| 4,743,491 A | 5/1988 | Asada et al. | |
| 4,748,525 A | 5/1988 | Perlov | |
| 4,763,215 A | 8/1988 | Gueugnoon et al. | |
| 4,767,516 A | 8/1988 | Nakatsuka et al. | |
| 4,982,301 A | 1/1991 | Endo | |
| 5,094,925 A | 3/1992 | Ise et al. | |
| 5,196,976 A | 3/1993 | Lazzari et al. | |
| 5,204,193 A | 4/1993 | Sato et al. | |
| 5,224,080 A | 6/1993 | Ohtsuki et al. | |
| 5,325,343 A | 6/1994 | Ohtsuki et al. | |
| 5,329,413 A | 7/1994 | Kondoh et al. | |
| 5,343,449 A | 8/1994 | Miyata et al. | |
| 5,347,485 A | 9/1994 | Taguchi et al. | |

(Continued)

FOREIGN PATENT DOCUMENTS

| | | |
|---|---|---|
| JP | 11283230 | 10/1999 |
| JP | 2001344725 | 12/2001 |

(Continued)

OTHER PUBLICATIONS

Ashar, Future Trends in Technology, Chapter 11, Magnetic Disk Drive Technology: Heads, Media, Channel, Interfaces and Integration, IEEE Press: New York, NY, pp. 306-333, 1997.

(Continued)

*Primary Examiner* — Holly Rickman
(74) *Attorney, Agent, or Firm* — Hollingsworth Davis, LLC

(57) ABSTRACT

A perpendicular magnetic recording medium having a dual-layer magnetic film is disclosed. The bottom layer is completely exchange decoupled, and the top layer contains a certain amount of exchange coupling optimized for recording performance. Preferably, the bottom magnetic layer contains stable oxide material (for example, $TiO_2$) and other non-magnetic elements (for example, Cr). A method of manufacturing the media is also disclosed.

19 Claims, 4 Drawing Sheets

(56) References Cited

U.S. PATENT DOCUMENTS

| | | |
|---|---|---|
| 5,486,967 A | 1/1996 | Tanaka et al. |
| 5,525,398 A | 6/1996 | Takai et al. |
| 5,567,523 A | 10/1996 | Rosenblum et al. |
| 5,636,093 A | 6/1997 | Gijs et al. |
| 5,640,374 A | 6/1997 | Hirokane et al. |
| 5,644,566 A | 7/1997 | Nakayama et al. |
| 5,659,537 A | 8/1997 | Hirokane et al. |
| 5,703,795 A | 12/1997 | Mankovitz |
| 5,830,569 A | 11/1998 | Hikosaka et al. |
| 6,117,011 A | 9/2000 | Lvov et al. |
| 6,174,597 B1 | 1/2001 | Yusu et al. |
| 6,183,893 B1 | 2/2001 | Futamoto et al. |
| 6,280,813 B1 | 8/2001 | Carey et al. |
| 6,292,329 B1 | 9/2001 | Sato et al. |
| 6,327,227 B1 | 12/2001 | Katayama et al. |
| 6,430,115 B1 | 8/2002 | Hirokane et al. |
| 6,468,670 B1 | 10/2002 | Ikeda et al. |
| 6,495,252 B1 | 12/2002 | Richter et al. |
| 6,528,149 B2 | 3/2003 | Yoshida et al. |
| 6,534,203 B2 | 3/2003 | Iwasaki et al. |
| 6,602,612 B2 | 8/2003 | Abarra et al. |
| 6,602,621 B2 | 8/2003 | Matsunuma et al. |
| 6,686,070 B1 | 2/2004 | Futamoto et al. |
| 6,687,067 B2 | 2/2004 | Brianti et al. |
| 6,707,643 B2 | 3/2004 | Takeo et al. |
| 6,716,516 B2 | 4/2004 | Futamoto et al. |
| 6,723,450 B2 | 4/2004 | Do et al. |
| 6,723,457 B2 | 4/2004 | Tanahashi et al. |
| 6,754,020 B1 | 6/2004 | Hikosaka et al. |
| 6,759,148 B2 | 7/2004 | Tanahashi et al. |
| 6,777,112 B1 | 8/2004 | Girt et al. |
| 6,794,028 B2 | 9/2004 | Uwazumi et al. |
| 6,815,082 B2 | 11/2004 | Girt |
| 6,830,824 B2 | 12/2004 | Kikitsu et al. |
| 6,846,583 B2 | 1/2005 | Inaba et al. |
| 6,852,398 B2 | 2/2005 | Yoshida et al. |
| 6,866,948 B2 | 3/2005 | Koda et al. |
| 6,875,492 B1 | 4/2005 | Pirzada et al. |
| 6,881,497 B2 | 4/2005 | Coffey et al. |
| 6,884,520 B2 | 4/2005 | Oikawa et al. |
| 6,890,667 B1 | 5/2005 | Lairson et al. |
| 7,056,605 B2 | 6/2006 | Kawada |
| 7,060,375 B2 | 6/2006 | Lee et al. |
| 7,070,870 B2 | 7/2006 | Bertero et al. |
| 7,144,640 B2 | 12/2006 | Hee et al. |
| 7,153,546 B2 | 12/2006 | Tanahashi et al. |
| 7,166,376 B2 | 1/2007 | Hikosaka et al. |
| 7,183,011 B2 | 2/2007 | Nakamura et al. |
| 7,232,620 B2 | 6/2007 | Inomata |
| 7,261,958 B2 | 8/2007 | Hirayama et al. |
| 7,311,983 B2 | 12/2007 | Watanabe et al. |
| 7,330,335 B2 | 2/2008 | Kikitsu et al. |
| 7,332,194 B2 | 2/2008 | Takenoiri et al. |
| 7,368,185 B2 | 5/2008 | Hirayama et al. |
| 7,384,699 B2 | 6/2008 | Nolan et al. |
| 7,470,474 B2 | 12/2008 | Sakawaki et al. |
| 7,635,498 B2 | 12/2009 | Sakai et al. |
| 7,678,476 B2 | 3/2010 | Weller et al. |
| 7,736,765 B2 | 6/2010 | Wu et al. |
| 8,110,298 B1 * | 2/2012 | Choe et al. ............ 428/827 |
| 8,119,263 B2 * | 2/2012 | Nolan et al. ............ 428/829 |
| 2002/0018917 A1 | 2/2002 | Sakai et al. |
| 2003/0082410 A1 | 5/2003 | Sato et al. |
| 2003/0108721 A1 | 6/2003 | Fullerton et al. |
| 2003/0113582 A1 | 6/2003 | Litvinov et al. |
| 2005/0019608 A1 | 1/2005 | Kim et al. |
| 2005/0142378 A1 | 6/2005 | Nemoto et al. |
| 2006/0146453 A1 * | 7/2006 | Parker et al. ............ 360/324.12 |
| 2006/0246323 A1 | 11/2006 | Liu et al. |
| 2008/0144213 A1 * | 6/2008 | Berger et al. ............ 360/110 |
| 2009/0068500 A1 * | 3/2009 | Kong et al. ............ 428/846.6 |

FOREIGN PATENT DOCUMENTS

| | | |
|---|---|---|
| JP | 2003168207 | 6/2003 |
| KR | 1020040025430 | 3/2004 |
| WO | WO2004090874 | 10/2004 |

OTHER PUBLICATIONS

Brandie et al., Optical and Magneto-Optical Characterization of Evaporated Co/Pt Alloys and Multilayers, IEEE Trans. Mag., 28(5), Sep. 1992, pp. 2967-2969.

Zhang et al., Pt Layer Thickness Dependence of Magnetic Properties in Co/Pt Multilayers, J. App. Phys., 69(8), Apr. 1991, pp. 5649-5651.

File history for U.S. Appl. No. 11/231,796, 137 pages.

File history for U.S. Appl. No. 11/367,821, 114 pages.

Muraoka et al., Analysis on Magnetization Transition of CGC Perpendicular Media, IEEE Transactions on Magnetics 38(4):1632-1636, Jul. 2002.

International Search Report and Written Opinion from Singapore Application No. SG 200606515-5, dated Mar. 27, 2007, 11 pages.

File History for U.S. Appl. No. 11/231,796, 426 pages.

File History for U.S. Appl. No. 11/367,821, 322 pages.

* cited by examiner

METHOD AND MANUFACTURE PROCESS FOR EXCHANGE DECOUPLED FIRST MAGNETIC LAYER

BACKGROUND

Magnetic thin-film media, wherein a fine grained polycrystalline magnetic alloy layer serves as the active recording medium layer, are generally classified as "longitudinal" or "perpendicular," depending on the orientation of the magnetic domains of the grains of the magnetic material. FIG. 1 shows a disk recording medium and a cross section of a disc showing the difference between longitudinal and perpendicular recording.

Perpendicular recording media are being developed for higher density recording as compared to longitudinal media. The thin-film perpendicular magnetic recording medium comprises a substrate and a magnetic layer having perpendicular magnetic anisotropy, wherein the magnetic layer comprises an easy axis oriented substantially in a direction perpendicular to the plane of the magnetic layer. Typically, the thin-film perpendicular magnetic recording medium comprises a rigid NiP-plated Al alloy substrate, or alternatively a glass or glass-ceramic substrate, and successively sputtered layers. The sputtered layers can include one or more underlayers, one or more magnetic layers, and a protective overcoat. The protective overcoat is typically a carbon overcoat which protects the magnetic layer from corrosion and oxidation and also reduces frictional forces between the disc and a read/write head. In addition, a thin layer of lubricant may be applied to the surface of the protective overcoat to enhance the tribological performance of the head-disc interface by reducing friction and wear of the protective overcoat.

Granular perpendicular recording media are being developed for its capability of further extending the areal recording density as compared to conventional perpendicular recording media which is limited by the existence of strong exchange coupling between magnetic grains. In contrast to conventional perpendicular media wherein the magnetic layer is typically sputtered in the presence of inert gas, most commonly argon (Ar), deposition of a granular perpendicular magnetic layer utilizes a reactive sputtering technique wherein oxygen ($O_2$) is introduced, for example, in a gas mixture of Ar and $O_2$. Not wishing to be bound by theory, it is believed that the introduction of $O_2$ provides a source of oxygen that migrates into the grain boundaries forming oxides within the grain boundaries, and thereby providing a granular perpendicular structure having a reduced exchange coupling between grains. However, the oxide formation and distribution in the magnetic layer has been found to be insufficiently uniform, so that magnetic clusters form with varying intergranular exchange strength, causing degradation in the recording process.

In fabricating high signal-to-noise ratio (SNR) magnetic recording media, it is desirable that the magnetic particles or grains of the magnetic layer(s) be of uniformly small size, with a small, uniform amount of exchange coupling between the magnetic particles or grains. The optimal value of the exchange coupling is different for longitudinal and perpendicular recording media, e.g., a higher exchange coupling is desired for perpendicular media. However, in each instance a constant small value of exchange coupling between neighboring magnetic particles or grains is desired.

A low value (i.e., small amount) of exchange coupling between neighboring magnetic particles or grains is desired in order that magnetic switching of the magnetic particles or grains does not become too highly correlated. Reducing the exchange coupling decreases the sizes of the magnetic particles or grains, i.e., the sizes of the magnetic switching units. The cross-track correlation length and media noise are correspondingly reduced. However, near-zero exchange coupling between magnetic particles or grains produces a very low squareness-sheared M-H hysteresis loop, a broad switching field distribution, decreased resistance to self-demagnetization and thermal decay, and low nucleation fields ($H_n$) in perpendicular media designs. Non-uniform exchange coupling allows some magnetic particles or grains to act independently, with small particle or grain size, while other magnetic particles or grains act in clusters, resulting in broad distributions of particle or grain size and anisotropy field.

A method of reducing exchange coupling in a uniform magnetic layer involves sputtering from a target already having stable oxide material incorporated. Therefore, from the beginning of the magnetic layer growth, well-separated grains are formed without clustering effects, and intergranular exchange is reduced. However, complete elimination of exchange coupling would result in writability issues due to a widened switching field distribution.

Accordingly, there exists a need to control the degree of intergranular exchange coupling in perpendicular magnetic recording media in order to optimize writing capability without invoking excessive media noise. There exists a particular need to control the degree of intergranular exchange coupling in a uniform manner.

SUMMARY

The invention relates to magnetic recording media having a dual layer granular magnetic layer.

One embodiment is a magnetic recording medium comprising a substrate and a granular magnetic layer, where the granular magnetic layer comprises one or more first layers that are substantially completely exchange decoupled and one or more second layers that are partially exchange coupled. According to one embodiment, the one or more first layers have an $H_c$ of greater than about 4,000 Oe and an $H_n$ of less than about 0.25 $H_c$. Preferably, $H_c$ is greater than about 6,000 Oe and $H_n$ is less than about 1,000 Oe.

In one variation, the one or more first layers comprise an oxide material, such as $TiO_2$. Preferably, the oxide material is present in an amount of about 4 to about 12 mol %.

In another variation, the one or more first layers comprise a non-magnetic element, such as Cr. Preferably, the non-magnetic element is present in an amount of about 4 to about 20 mol %.

According to another variation, the one or more second layers are substantially free of oxide material.

In one embodiment, a composition of at least one of the first layers is $CoCr_xPt_y$—$(TiO_2)_z$, where x has a value of from 4 to 20, y has a value of from 12 to 25, and z has a value of from 4 to 12. For example, the composition of at least one of the first layers may be $CoCr_{10}Pt_{18}$—$(TiO_2)_6$.

Another embodiment is a magnetic recording medium comprising a substrate, one or more soft underlayers, one or more seed layers, one or more interlayers, a granular magnetic recording layer, and one or more cap layers, where the granular magnetic layer comprises one or more first layers that are substantially completely exchange decoupled and one or more second layers that are partially exchange coupled.

Yet another embodiment is a method of manufacturing a magnetic recording medium comprising depositing one or more first magnetic layers onto a substrate and depositing one or more second magnetic layers onto the first magnetic layers, where the first magnetic layers are substantially completely exchange decoupled and the second magnetic layers are partially exchange coupled.

According to a preferred embodiment, the method further comprises mixing at least one metallic powder having a particle size of less than about 180 microns and at least one oxide powder where about 2% to about 5% of the oxide powder has a particle size greater than about 10 microns. It is also preferred that the method comprise mixing the metallic and oxide powders in a high energy ball mill, degassing, and performing hot isostatic pressing to greater than 99% of theoretical density. The hot isostatic pressing is preferably performed at a temperature of from about 1,050° C. to about 1,300° C. and at a pressure of from about 15,000 psi to 25,000 psi.

Additional advantages of this invention will become readily apparent to those skilled in this art from the following detailed description, wherein only the preferred embodiments of the invention are shown and described, by way of illustration of the best mode contemplated for carrying out the invention. As will be realized, this invention is capable of other and different embodiments, and its details are capable of modifications in various obvious respects, all without departing from the invention. Accordingly, the drawings and description are to be regarded as illustrative in nature and not as restrictive.

BRIEF DESCRIPTION OF THE DRAWINGS

The present invention will be better understood by reference to the Detailed Description when taken together with the attached drawings, wherein.

DETAILED DESCRIPTION

Figure 1:
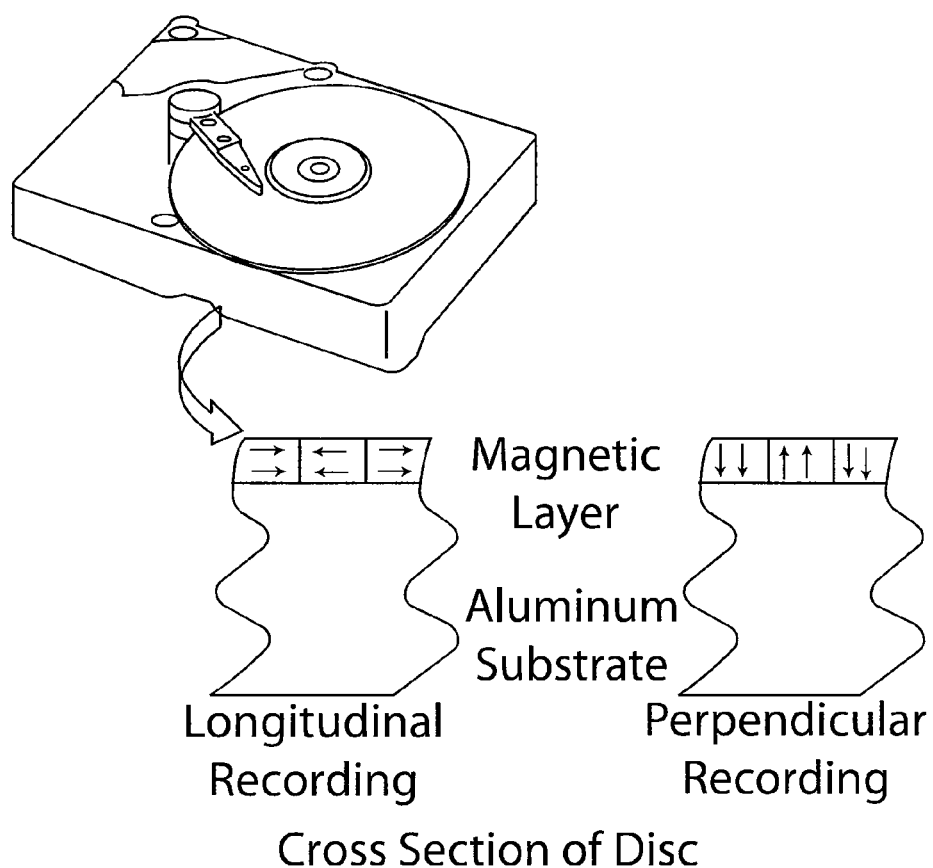
FIG. 1 schematically shows a magnetic disk recording medium comparing longitudinal and perpendicular magnetic recording.
Figure 2:
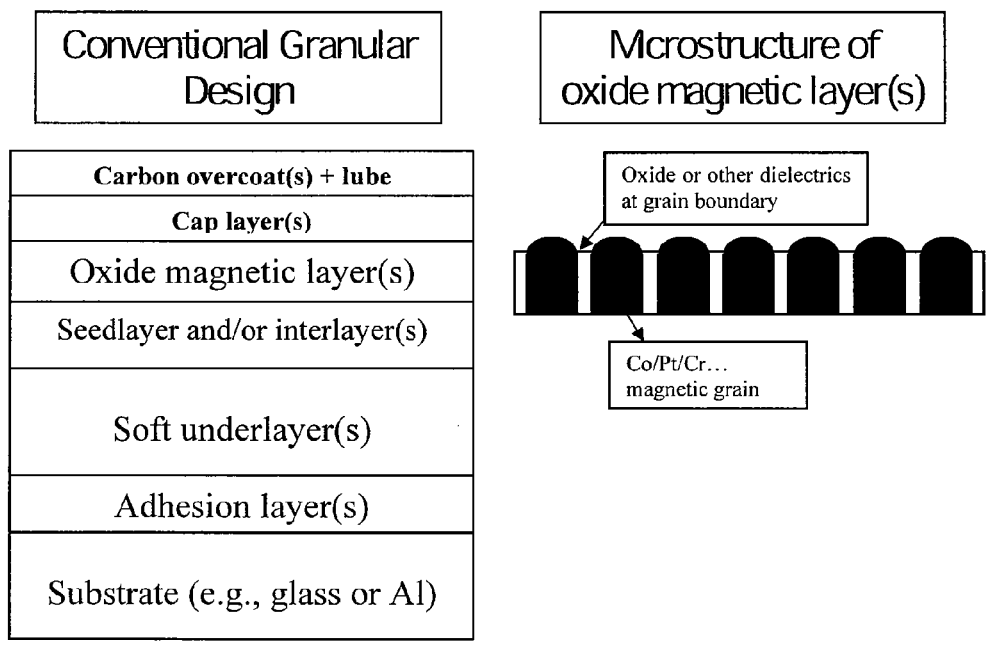
FIG. 2 shows a granular perpendicular magnetic recording medium.
Figure 3:
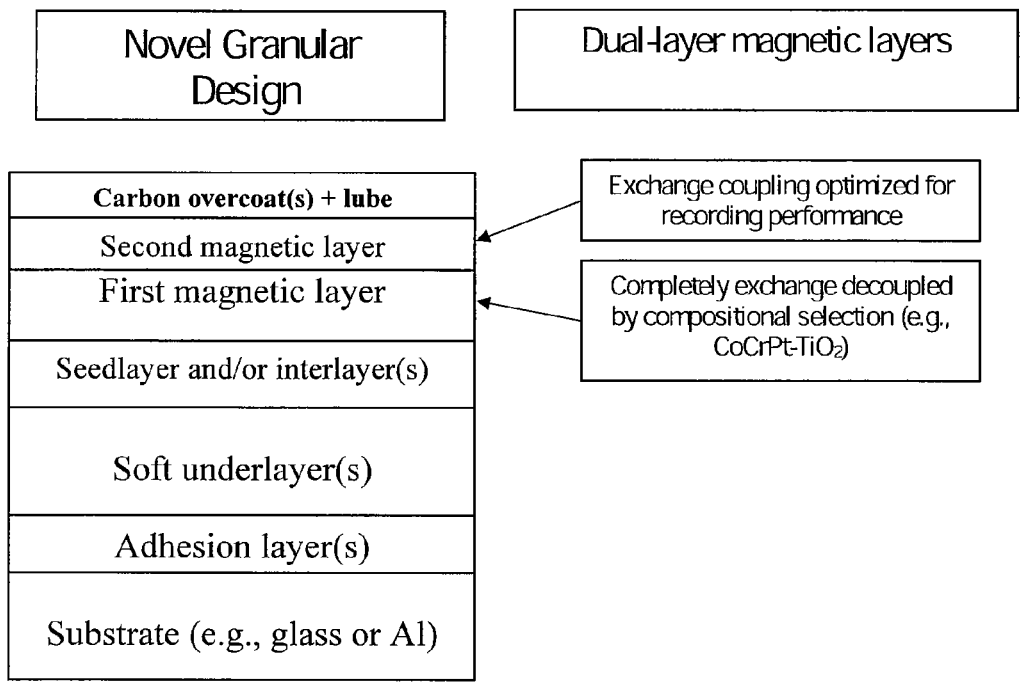
FIG. 3 shows a novel perpendicular magnetic recording medium according to an embodiment of this invention.

This invention relates to a perpendicular magnetic recording medium having a substrate, soft underlayer(s), seed layer(s), interlayer(s), and a magnetic recording layer comprising grains. FIG. 3 is an embodiment of this invention showing a perpendicular magnetic recording medium comprising a first magnetic layer (M1) to maximize exchange decoupling and a second magnetic layer (M2) to optimize coupling for higher squareness and lower dynamic Hcr.

M1 is substantially completely exchange decoupled. For example, M1 may have values of coercivity ($H_c$) greater than about 4,000 Oe and nucleation field ($H_n$) less than about 0.25 $H_c$. Preferably, $H_c$ is greater than about 6,000 Oe and $H_n$ is less than about 1,000 Oe.

M1 may contain a stable oxide material, such as $TiO_2$, preferably in an amount of about 4 to about 12 mol %. M1 may also contain other non-magnetic elements for the reductions of saturation magnetization (Ms), such as Cr, preferably in an amount of about 4 to about 20 mol %. Multiple layers can be employed to achieve desired film property and performance.

Examples of targets are $Co_{100-x-y}Pt_x(MO)_y$ and/or $Co_{100-x-y-z}Pt_x(X)_y(MO)_z$ series (X is the $3^{rd}$ additives such as Cr, and M is metal elements such as Si, Ti and Nb). Besides oxides in M1, the list can be easily extended such that the magnetic grains in M1 can be isolated from each other with dielectric materials at grain boundary, such as nitrides $(M_xN_y)$, carbon (C) and carbides $(M_xC_y)$. The examples of sputter targets are $Co_{100-x-y}Pt_x(MN)_y$, $Co_{100-x-y}Pt_x(MC)_y$, and/or $Co_{100-x-y-z}Pt_x(X)_y(MN)_z$, $Co_{100-x-y-z}Pt_x(X)_y(MC)_z$ series.

Figure 4:
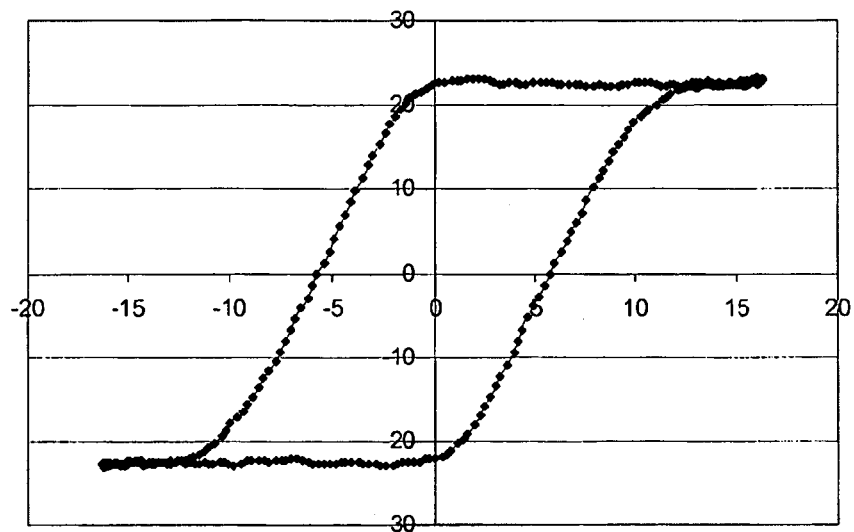
FIG. 4 shows a measured MOKE loop of a sample with underlayers and a single magnetic layer having a composition of $CoCr_{10}Pt_{18}(TiO_2)_6$.

For example, M1 may have a composition of CoCrPt—$TiO_2$. FIG. 4 shows a measured MOKE loop of a sample with underlayers and a single magnetic layer with a composition of $CoCr_{10}Pt_{18}(TiO_2)_6$. The magnetic layer was sputtered with an Ar and $O_2$ mixture at 30 mTorr pressure, with $O_2$ gas flow controlled to repair the oxide stoichiometry. From the large value of Hc–Hn and the loop slope, it can be concluded that the sample is sufficiently exchange decoupled.

M1 may be sputter deposited under condition for manufacturing a perpendicular magnetic layer, i.e., typically under a high pressure of greater than 20 mTorr in an argon and oxygen containing chamber. Preferably, M1 is sputter deposited in a reactive gas environment to repair the dissociation of oxide materials that occurs in the energetic plasma environment of a magnetron sputter system, thereby producing stable oxide material in the grain boundaries of M1.

The process of manufacturing magnetic layer M1 may comprise mixing metallic powders having a particle size of less than about 180 microns and oxide powders, where 2-5% of the oxide powder has a particle size greater than about 10 microns. The process may also comprise the use of high-energy ball milling to blend the metallic and oxide powders. The blended powders are loaded into a steel can, degassed, and hot isostatically pressed to at least 99% of the theoretical density. For example, the powders may be pressed at a temperature between 1,050 and 1,300° C. and a pressure between 15,000 and 25,000 psi. Particle size selection and blending will contribute to a fine and homogeneous dispersion of the oxide powders in the powder mixture and minimize spitting, which is known to occur with sputtering of oxides.

The second magnetic layer M2 is partially exchange coupled, i.e., it contains a controlled amount of exchange coupling optimized for recording performance. Controlling, or "tuning," the amount of exchange coupling of the overall magnetic layer stack to a desired value may be accomplished by varying the thickness of the relatively thinner partially exchange coupled magnetic layer.

Preferably, M2 does not include any dielectric additive, such as an oxide, and is not deposited by reactive sputtering with oxygen. The layer M2 may be sputtered from a target under low pressure of less than 20 millitorr in an argon-containing chamber, i.e., conditions similar to that used for manufacturing a longitudinal magnetic recording layer wherein typically B and/or Cr is at the grain boundary.

The sputter targets can be used including conventional longitudinal media alloys and/or alloy perpendicular media. Desired performance will be achieved without reactive sputtering. Single layer or multiple layers can be sputtered on the top of oxide containing magnetic layers. The non-oxide magnetic layer(s) will grow epitaxially from oxide granular layer underneath. The orientation could eventually change if these layers are too thick. The examples of these are $Co_{100-x-y-z-\alpha}Cr_xPt_yB_zX_\alpha Y_\beta$.

Epitaxial growth in M2 may be established through careful control of the process and interface to propagate a well-established crystallographic orientation and distribution of the bottom (first) magnetic layer to the top (second) magnetic layer. Meanwhile, the grain separation for the top layer may be tuned to achieve a uniform exchange coupling strength that is suitable for a medium/head integrated design.

An embodiment of the media comprises, from the bottom to the top:
(1) Substrate: polished glass, glass ceramics, or Al/NiP.
(2) Adhesion layers to ensure strong attachment of the functional layers to the substrates. One can have more than one layer for better adhesion or skip this layer if adhesion is fine. The examples include Ti alloys.
(3) Soft underlayers (SUL) include various design types, including a single SUL, anti-ferromagnetic coupled (AFC) structure, laminated SUL, SUL with pinned layer (also called anti-ferromagnetic exchange biased layer), and so on. The examples of SUL materials include $Fe_xCo_yB_z$ based, and $Co_xZr_yNb_z/Co_xZr_yTa_z$ based series.
(4) Seed layer(s) and interlayer(s) are the template for Co (00.2) growth. Examples are RuX series of materials.
(5) Magnetic layers (M1) as described above.
(6) Magnetic layers (M2) as described above.
(7) Cap layer, which is optional for this design. In one variation, with dense grains and grain boundary without oxygen may not be necessary. Conventional carbon and lubrication can be adapted for the embodiment of the claimed media to achieve adequate mechanical performance.

The above layered structure of an embodiment is an exemplary structure. In other embodiments, the layered structure could be different with either less or more layers than those stated above.

Instead of the optional NiP coating on the substrate, the layer on the substrate could be any Ni-containing layer such as a NiNb layer, a Cr/NiNb layer, or any other Ni-containing layer. Optionally, there could be an adhesion layer between the substrate and the Ni-containing layer. The surface of the Ni-containing layer could be optionally oxidized.

The substrates used can be Al alloy, glass, or glass-ceramic. The magnetically soft underlayers according to present invention are amorphous or nanocrystalline and can be FeCoB, FeCoC, FeCoTaZr, FeTaC, FeSi, CoZrNb, CoZrTa, etc. The seed layers and interlayer can be Cu, Ag, Au, Pt, Pd, Ru-alloy, etc. The CoPt-based magnetic recording layer can be CoPt, CoPtCr, CoPtCrTa, CoPtCrB, CoPtCrNb, CoPtTi, CoPtCrTi, CoPtCrSi, CoPtCrAl, CoPtCrZr, CoPtCrHf, CoPtCrW, CoPtCrC, CoPtCrMo, CoPtCrRu, etc., deposited under argon gas (e.g., M2), or under a gas mixture of argon and oxygen or nitrogen (e.g., M1). Dielectric materials such as oxides, carbides or nitrides can be incorporated into the target materials also.

Embodiments of this invention include the use of any of the various magnetic alloys containing Pt and Co, and other combinations of B, Cr, Co, Pt, Ni, Al, Si, Zr, Hf, W, C, Mo, Ru, Ta, Nb, O and N, in the magnetic recording layer.

In a preferred embodiment the total thickness of SUL could be 100 to 5000 Å, and more preferably 600 to 2000 Å. There could be a more than one soft under layer. The laminations of the SUL can have identical thickness or different thickness. The spacer layers between the laminations of SUL could be Ta, C, etc. with thickness between 1 and 50 Å. The thickness of the seed layer, $t_s$, could be in the range of 1 Å<$t_s$<50 Å. The thickness of an intermediate layer could be 10 to 500 Å, and more preferably 100 to 300 Å. The thickness of the magnetic recording layer is about 50 Å to about 300 Å, more preferably 80 to 150 Å. The adhesion enhancement layer could be Ti, TiCr, Cr etc. with thickness of 10 to 50 Å. The overcoat cap layer could be hydrogenated, nitrogenated, hybrid or other forms of carbon with thickness of 10 to 80 Å, and more preferably 20 to 60 Å.

The magnetic recording medium has a remanent coercivity of about 2000 to about 10,000 Oersted, and an $M_rt$ (product of remanance, Mr, and magnetic recording layer thickness, t) of about 0.2 to about 2.0 memu/cm$^2$. In a preferred embodiment, the coercivity is about 2500 to about 9000 Oersted, more preferably in the range of about 4000 to about 8000 Oersted, and most preferably in the range of about 4000 to about 7000 Oersted. In a preferred embodiment, the $M_rt$ is about 0.25 to about 1 memu/cm$^2$, more preferably in the range of about 0.4 to about 0.9 memu/cm$^2$.

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

Each of the layers constituting magnetic recording media of the present invention, except for a carbon overcoat and a lubricant topcoat layer, may be deposited or otherwise formed by any suitable physical vapor deposition technique (PVD), e.g., sputtering, or by a combination of PVD techniques, i.e., sputtering, vacuum evaporation, etc., with sputtering being preferred. The carbon overcoat is typically deposited with sputtering or ion beam deposition. The lubricant layer is typically provided as a topcoat by dipping of the medium into a bath containing a solution of the lubricant compound, followed by removal of excess liquid, as by wiping, or by a vapor lube deposition method in a vacuum environment.

Sputtering is perhaps the most important step in the whole process of creating recording media. There are two types of sputtering: pass-by sputtering and static sputtering. In pass-by sputtering, disks are passed inside a vacuum chamber, where they are deposited with the magnetic and non-magnetic materials that are deposited as one or more layers on the substrate when the disks are moving. Static sputtering uses smaller machines, and each disk is picked up and deposited individually when the disks are not moving. The layers on the disk of the embodiment of this invention were deposited by static sputtering in a sputter machine.

The sputtered layers are deposited in what are called bombs, which are loaded onto the sputtering machine. The bombs are vacuum chambers with targets on either side. The substrate is lifted into the bomb and is deposited with the sputtered material.

A layer of lube is preferably applied to the carbon surface as one of the topcoat layers on the disk.

Sputtering leads to some particulates formation on the post sputter disks. These particulates need to be removed to ensure that they do not lead to the scratching between the head and substrate. Once a layer of lube is applied, the substrates move to the buffing stage, where the substrate is polished while it preferentially spins around a spindle. The disk is wiped and a clean lube is evenly applied on the surface.

Subsequently, in some cases, the disk is prepared and tested for quality thorough a three-stage process. First, a burnishing head passes over the surface, removing any bumps (asperities as the technical term goes). The glide head then goes over the disk, checking for remaining bumps, if any. Finally the certifying head checks the surface for manufacturing defects and also measures the magnetic recording ability of the disk.

The magnetic layer of the present invention provides improved corrosion performance over conventional perpendicular recording media. The present magnetic layer compositions provide improved corrosion resistance, while maintaining the magnetic properties suitable for high density perpendicular recording.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A magnetic recording medium comprising:
    a substrate; and
    a granular magnetic layer, wherein the granular magnetic layer comprises one or more first layers being substantially completely exchange decoupled and one or more second layers being partially exchange coupled, wherein the one or more first layers have an $H_c$ of greater than about 4,000 Oe and an $H_n$ of less than about 0.25 $H_c$ and wherein separation between grain boundaries of the one or more second layers is tuned to achieve a substantially uniform, controlled value of exchange coupling strength for the granular magnetic layer.

2. The magnetic recording medium of claim 1, wherein the one or more first layers have an $H_c$ of greater than about 6,000 Oe and an $H_n$ of less than about 1,000 Oe.

3. The magnetic recording medium of claim 1, wherein the one or more first layers comprise an oxide material in an amount of about 4 to about 12 mol %.

4. The magnetic recording medium of claim 3, wherein the oxide material is $TiO_2$.

5. The magnetic recording medium of claim 1, wherein the one or more first layers comprise a non-magnetic element.

6. The magnetic recording medium of claim 5, wherein the non-magnetic element is present in an amount of about 4 to about 20 mol %.

7. The magnetic recording medium of claim 5, wherein the non-magnetic element is Cr.

8. The magnetic recording medium of claim 1, wherein a composition of at least one of the first layers is $CoCr_xPt_y$—$(TiO_2)_z$, wherein x has a value of from 4 to 20, y has a value of from 12 to 25, and z has a value of from 4 to 12.

9. The magnetic recording medium of claim 8, wherein the composition is $CoCr_{10}Pt_{18}$—$(TiO_2)_6$.

10. The magnetic recording medium of claim 1, wherein the one or more second layers are substantially free of oxide material.

11. A magnetic recording medium comprising:
    a substrate;
    one or more soft underlayers;
    one or more seed layers;
    one or more interlayers;
    a granular magnetic recording layer; and
    one or more cap layers, wherein the granular magnetic layer comprises one or more first layers being substantially completely exchange decoupled and one or more second layers being partially exchange coupled, and wherein the one or more first layers have an $H_c$ of greater than about 4,000 Oe and an $H_n$ of less than about 0.25 $H_c$ and wherein separation between grain boundaries of the one or more second layers is tuned to achieve a substantially uniform, controlled value of exchange coupling strength for the granular magnetic layer.

12. The magnetic recording medium of claim 11, wherein a composition of at least one of the first layers is $CoCr_xPt_y$—$(TiO_2)_z$, wherein x has a value of from 4 to 20, y has a value of from 12 to 25, and z has a value of from 4 to 12.

13. The magnetic recording medium of claim 11, wherein the composition is $CoCr_{10}Pt_{18}$—$(TiO_2)_6$.

14. A method of manufacturing a magnetic recording medium comprising:
    depositing one or more first magnetic layers onto a substrate; and
    depositing one or more second magnetic layers onto the first magnetic layers, wherein the first magnetic layers are substantially completely exchange decoupled and the second magnetic layers are partially exchange coupled, wherein the one or more first layers have an $H_c$ of greater than about 4,000 Oe and an $H_n$ of less than about 0.25 $H_c$, and wherein depositing the one or more second layers comprises depositing the one or more second layers under deposition conditions that achieve a substantially uniform, controlled value of exchange coupling strength for the magnetic recording medium.

15. The method of claim 14, further comprising mixing at least one metallic powder having a particle size of less than about 180 microns and at least one oxide powder where about 2% to about 5% of the oxide powder has a particle size greater than about 10 microns.

16. The method of claim 15, further comprising mixing the metallic and oxide powders in a high energy ball mill, degassing, and performing hot isostatic pressing to greater than 99% of theoretical density.

17. The method of claim 16, wherein the hot isostatic pressing is performed at a temperature of from about 1,050° C. to about 1,300° C. and at a pressure of from about 15,000 psi to 25,000 psi.

18. The magnetic recording medium of claim 1, wherein the one or more second layers are on the one or more first layers.

19. The magnetic recording medium of claim 11, wherein the one or more second layers are on the one or more first layers.

* * * * *